United States Patent [19]
Easter

[11] 3,740,639
[45] June 19, 1973

[54] TRANSFORMER COUPLED SWITCHING REGULATOR

[75] Inventor: Finis Claude Easter, Canoga Park, Calif.

[73] Assignee: RCA Corporation, New York, N.Y.

[22] Filed: Apr. 6, 1972

[21] Appl. No.: 241,677

[52] U.S. Cl. .............................. 321/2, 323/DIG. 1
[51] Int. Cl. ........................................... H02m 3/28
[58] Field of Search ..................... 321/2; 323/DIG. 1

[56] References Cited
UNITED STATES PATENTS

| | | | |
|---|---|---|---|
| 3,590,361 | 6/1971 | Bishop et al. | 323/DIG. 1 |
| 3,328,674 | 6/1967 | Bleicher | 323/DIG. 1 |

OTHER PUBLICATIONS
"Considerations in the Design of Switching Type Regulators," Russell D. Loucks, Solid/State/Design, April, 1963, pp. 30–34.

*Primary Examiner*—William M. Shoop, Jr.
*Attorney*—Edward J. Norton and Joseph S. Tripoli

[57] ABSTRACT

A switching regulator, of the type having a switching device whose state of conduction is controlled in response to the voltage across a load, which includes a transformer whose primary winding is connected in circuit with the switching device. A rectifier and inductive storage device are connected in circuit with the secondary winding, a diode being connected from one end of the secondary winding to one load terminal, for transferring energy from the secondary winding to the load at times when the switching device is rendered non-conductive.

8 Claims, 2 Drawing Figures

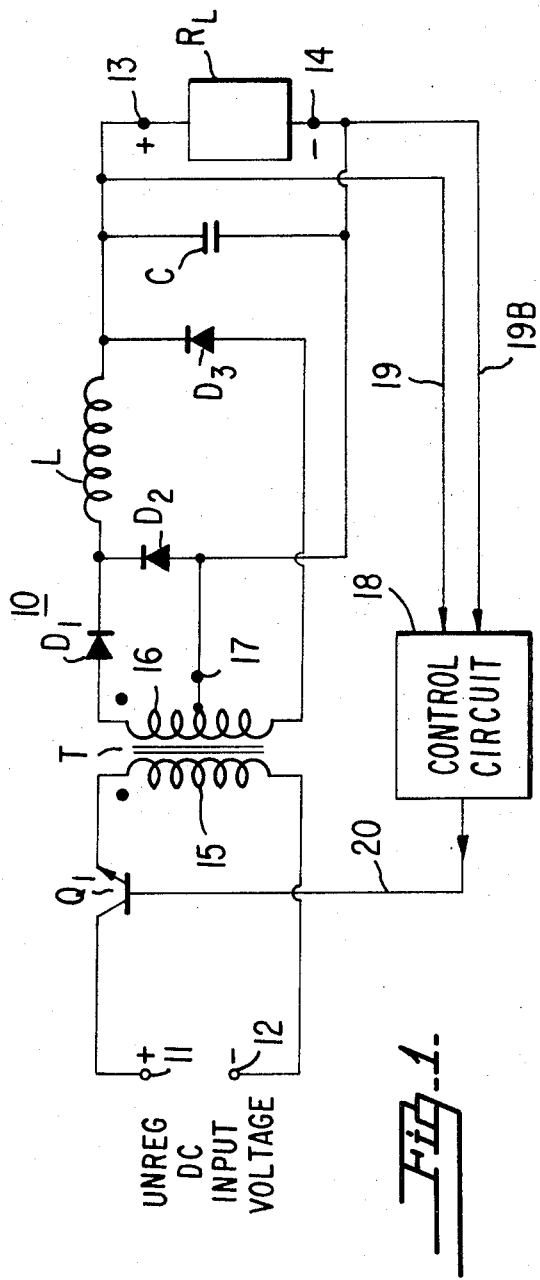
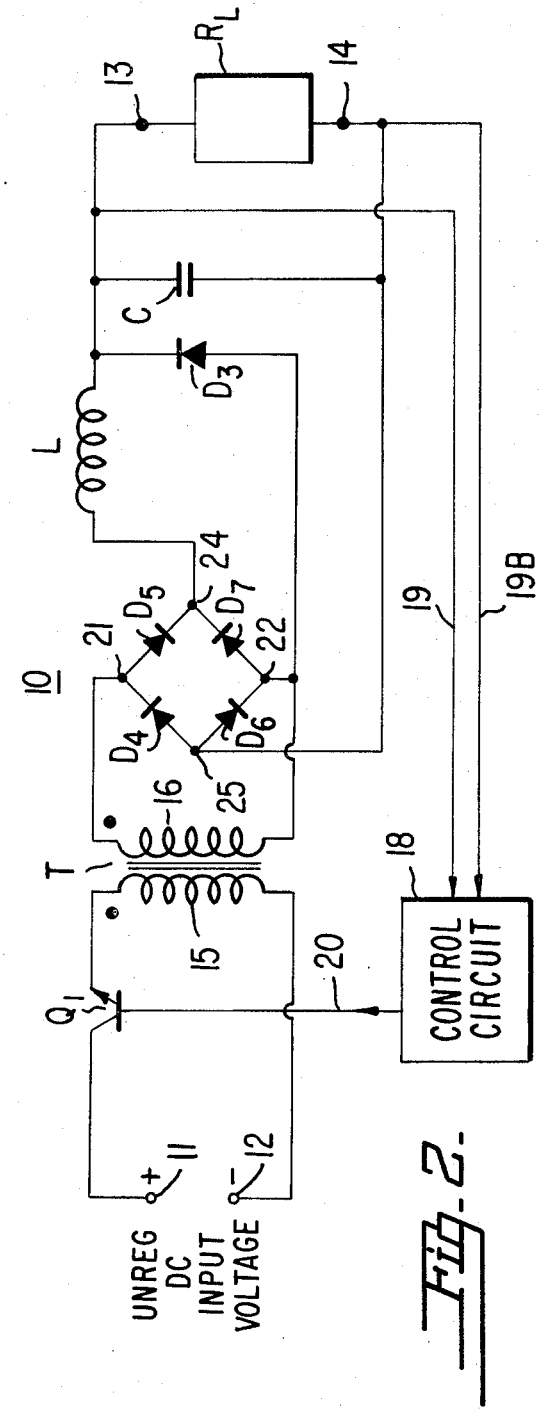

TRANSFORMER COUPLED SWITCHING REGULATOR

The present invention generally relates to switching voltage regulators and more specifically to switching regulators of the type which utilizes a transformer.

A typical transformer coupled switching regulator is shown and described in U.S. Pat. No. 3,453,521. In the aforementioned patent, a source of unregulated DC voltage is connected in series with a controllable switching device and the primary winding of a transformer. The secondary winding of the transformer is connected in series with a rectifying diode and the load with a filter capacitor connected across the load terminals.

The use of transformer coupling in a switching regulator is desirable in that it provides isolation between the input and output terminals. However, since transformer windings are essentially inductors, there is a tendency to store energy in the inductance thereof. This energy storage in the transformer windings tends to decrease the overall efficiency of the switching regulator.

The present invention not only employs the desirable effects of transformer coupling, that is, the isolation provided thereby, but also provides for the utilization of the stored energy in the secondary winding in a manner which tends to reduce the output ripple voltage.

In accordance with the present invention there is provided in a switching voltage regulator of the type having: a pair of input terminals adapted for connection to a source of unregulated voltage; a pair of output terminals; a switching device; and a control device for controlling the state of conduction of the switching device in response to the output voltage, the circuit comprising a transformer having one end of the primary winding thereof connected to the switching device and the other end of the primary winding connected to one input terminal. The other input terminal is connected to the switching device. In addition, a rectifying means is connected in circuit with one end of the secondary winding and an inductive storage means is connected between the rectifying means and one of the output terminals. A diode is then provided between the other end of the secondary winding and the one output terminal for the transfer of energy from the secondary winding to the load at certain times.

In the Figures:

FIG. 1 is a diagram of one embodiment of the present invention; and

FIG. 2 is another embodiment of the present invention.

Referring now to FIG. 1, there is provided a switching voltage regulator shown generally as 10, having a pair of input terminals 11 and 12 adapted for connection to a source of unregulated DC voltage (not shown) and a pair of output terminals 13 and 14 adapted for connection to a load shown as $R_L$.

A switching device which is operated in either an on or an off condition of conduction is provided in the form of switching transistor Q1. The collector electrode of transistor Q1 is connected to input terminal 11 where the positive polarity of the input voltage is applied. The emitter electrode of transistor Q1 is connected to one end of the primary winding 15 of transformer T. The other end of the primary winding of transformer T is connected to input terminal 12 where the negative polarity of the input voltage is applied. Transformer T also has a secondary winding designated 16. The polarity of the primary winding 15 and the polarity of the secondary winding 16 are as shown in FIG. 1 by the dot notation. The anode electrode of a signal rectifying diode D1 is connected to one end of the secondary winding 16. The cathode electrode of diode D1 is connected to one end of inductor L. Inductor L provides energy storage as will be explained more fully herein.

The secondary winding 16 of transformer T in the embodiment of the invention shown in FIG. 1 has a center tap designated as terminal 17. Terminal 17 is connected to the anode electrode of diode D2. The cathode electrode of diode D2 is connected to the cathode electrode of diode D1 and one end of inductor L. The anode electrode of diode D2 is also connected to output terminal 14. Diode D2 provides a fly back function in conjunction with inductor L as will be more fully explained herein. In addition, there is provided another diode D3 whose anode electrode is connected to the other end of the secondary winding 16 and whose cathode electrode is connected to output terminal 13. A filter capacitor C is connected across the output terminals 13 and 14 to help smooth the the output voltage waveform.

A control circuit 18 is provided which has an input connection from output terminal 13 via line 19, another input connection from output terminal 14 via line 19B and an output connection to the base electrode of switching transistor Q1 via line 20. The control circuit 18 senses the voltage appearing across output terminals 13 and 14 and controls the state of conduction of transistor Q1 in response thereto. In this manner a regulated DC voltage is supplied to the output terminals 13 and 14. Control circuit 18 may take many forms as is known in the switching regulator art.

In the operation of the embodiment of the invention shown in FIG. 1, the control circuit 18 switches transistor Q1 between states of conduction and non-conduction depending upon the voltage appearing at the output terminals 13 and 14 and hence the voltage as seen by the load $R_L$.

When transistor Q1 is turned on, a positive polarity voltage signal appears across the primary winding 15, that is, the dotted side of the primary sees a positive voltage. Assuming tight coupling between the primary and secondary windings 15 and 16, and a 1:1 turns ratio therebetween, a similar voltage will appear across the secondary winding 16 with the dotted end having a positive polarity. Diode D1 will now conduct since its anode electrode is at a higher potential than the cathode electrode thereof, whereas diodes D2 and D3 will not conduct since their anodes will see a lower potential than their respective cathode electrodes. At this time there will be a build up of current and flux in inductor L and energy will be stored therein.

When switching transistor Q1 is rendered non-conductive the field built up in the primary winding 15 begins to collapse and the voltage across the winding 15 reverses. The dotted side of the winding 15 now has a negative polarity. This change in polarity is also seen at the secondary winding 16 and the dotted end thereof now has a negative polarity, the other end thereof having a positive polarity. At this time diode D1 is rendered non-conductive and diodes D2 and D3 are rendered conductive. Diode D2 provides the flyback function and energy is discharged from the inductor L through the path including diode D2, inductor L and the capacitor C in parallel with the load $R_L$.

In addition, diode D3 may be thought of as a flyback diode for the transformer secondary winding 16 and energy previously stored in the secondary winding 16 is discharged into the load $R_L$ in a path including diode D3, capacitor C in parallel with the load $R_L$, the center tap 17 of the secondary winding 16 and at least a portion of the secondary winding 16. It should be noted at this point that diode D3 also limits the most negative swing of the signal appearing across the secondary winding 16 from end-to-end since the cathode electrode of diode D3 is returned to the positive polarity regulated output voltage appearing at output terminal 13. Diode D3 thus improves the ripple voltage at the output by supplying an additional signal component to the output terminal 13 and improves the overall efficiency of the system by utilizing energy stored in the transformer. Hence, there is an improved recovery of energy on the secondary side of transformer T.

Referring now to FIG. 2, where elements common to FIG. 1 are given the same designations of letters and numerals as in FIG. 1, there is shown another embodiment of the invention. In FIG. 2, a full wave bridge rectifier, comprising diodes D4-D7, is provided having input terminals 21 and 22 and output terminals 23 and 24. In addition, the secondary winding 16 of FIG. 2 does not have a center tap connection. Diode D4 has its anode electrode connected to terminal 23 and its cathode electrode connected to terminal 21. Diode D5 has its anode electrode connected to terminal 21 and its cathode electrode connected to terminal 24. Diode D6 has its anode electrode connected to terminal 23 and its cathode electrode connected to terminal 22. Diode D7 has its anode electrode connected to terminal 22 and its cathode electrode connected to terminal 24.

The bridge input terminal 21 is connected to the dotted end of secondary winding 16, while the bridge input terminal 22 is connected to the other end of secondary winding 16. Bridge output terminal 24 is connected to one end of inductor L and terminal 23 is connected to the regulator output terminal 14. Diode D3 is connected, as in FIG. 1, with its cathode electrode connected to the output terminal 13 and its anode electrode connected to the other end, or the non-dotted side, of secondary winding 16.

The operation of the circuit in FIG. 2 is similar to that of FIG. 1. When the dotted side of the secondary winding 16 in FIG. 2 is positive and the other end of the winding 16 is negative in polarity, that is, while transistor Q1 is conducting, diodes D5 and D6 are rendered conductive and diodes D3, D4 and D7 are rendered non-conductive. At this time, energy is being stored in the inductor L and in the transformer T.

When the polarity across winding 16 reverses, diodes D7, D4 and D3 are rendered conductive and diodes D5 and D6 are rendered non-conductive. Now energy is discharged from the inductor L to the load $R_L$ in a path which includes inductor L, the load $R_L$ in parallel with capacitor C, diode D4, the winding 16 and diode D7. At the same time energy is being transferred to the load via the path including diode D3, the load $R_L$, diode D4 and the winding 16.

Thus, FIGS. 1 and 2 show two embodiments of a switching regulator which utilizes transformer coupling and has provision for transferring energy stored in the transformer to the load.

It should be noted that the invention described above may be adapted for use as a switching current regulator as well as a switching voltage regulator without departing from the spirit of the inventive concept.

What is Claimed is:

1. In a switching regulator of the type having: a pair of input terminals adapted for connection to a source of unregulated voltage; a pair of output terminals adapted for connection to a load; and a switching means connected to one input terminal and a control means responsive to the voltage across the load for controlling the conduction of the switching means, the circuit comprising:

a transformer having a primary and a secondary winding, one end of said primary winding being connected to said switching means and the other end thereof being connected to the other input terminal;

rectifying means connected in circuit with one end of said secondary winding;

inductive energy storage means connected between said rectifying means and one of said output terminals; and a diode connected between the other end of said secondary winding and said one output terminal for transferring energy from the secondary winding to the load at certain times.

2. The circuit according to claim 1 wherein said rectifying means comprises a second diode having two electrodes, one electrode thereof being connected to said one end of the secondary winding, the other electrode thereof being connected to said inductive energy storage means.

3. The circuit according to claim 2 further comprising a flyback diode having two electrodes, one electrode thereof being connected to the other electrode of said diode and the other electrode of said flyback diode being connected to the other output terminal and to a point between the ends of the secondary winding.

4. The circuit according to claim 3 further comprising a capacitor connected across said pair of output terminals.

5. In a switching voltage regulator of the type having: a pair of input terminals adapted for connection to a source of unregulated voltage; a pair of output terminals adapted for connection to a load to be supplied with a regulated voltage; a switching means connected to one input terminal and having a conducting and a non-conducting state; and a control means connected between said switching means and one of said output terminals, said control means being responsive to the voltage across said load for controlling the state of conduction of said switching means, the circuit comprising:

a transformer having a primary and a secondary winding, one end of said primary winding being connected to said switching means and the other end thereof being connected to the other input terminal;

a first diode having two electrodes, one electrode thereof being connected to one end of said secondary winding;

an inductive energy storage means connected between the other electrode of the first diode and one of said output terminals;

a second diode having two electrodes, one electrode of said second diode being connected to the other end of said secondary winding and the other electrode of said second diode being connected to said one output terminal, said second diode being rendered conductive when said switching means exhibits a state of non-conduction; and a third diode having two electrodes, one electrode thereof being connected to the other electrode of said first diode, the other electrode of said third diode being connected to the other output terminal and to a point between the ends of said secondary winding.

6. The circuit according to claim 5 further comprising a capacitor connected across said pair of output terminals.

7. In a switching voltage regulator of the type having: a pair of input terminals adapted for connection to a source of unregulated voltage; a pair of output terminals adapted for connection to a load to be supplied with a regulated voltage; a switching means connected to one input terminal and having a conducting and a nonconducting state; and a control means connected between said switching means and one of said regulator output terminals, said control means being responsive to the voltage across said load for controlling the state of conduction of said switching means, the circuit comprising:

a transformer having a primary and a secondary winding, one end of said primary winding being connected to said switching means and the other end thereof being connected to the other input terminal;

a full wave bridge rectifier circuit having a pair of input terminals and a pair of output terminals, one bridge input terminal being connected to one end of the secondary winding, the other bridge input terminal being connected to the other end of the secondary winding, one of the bridge output terminals being connected to one of the regulator output terminals;

an inductive energy storage means connected between the other bridge output terminal and the other regulator output terminal; and a diode having two main electrodes, one main electrode thereof being connected to the other end of the secondary winding, the other main electrode of said diode being connected to the other regulator output terminal, said diode being rendered conductive when said switching means is rendered nonconductive for transferring energy stored in the secondary winding to said load.

8. The circuit according to claim 7 further comprising a capacitor connected across said pair of output terminals.

* * * * *